United States Patent

Lindboe

[15] 3,690,460
[45] Sept. 12, 1972

[54] RELIEF VALVE FOR OIL FILTERS OR THE LIKE

[72] Inventor: Clifford L. Lindboe, Palatine, Ill.

[73] Assignees: Ross W. Lyon; Rosclare M. Lyon; Robert E. Lyon, d/b/a Lyon Industries, Addison, Ill.

[22] Filed: March 11, 1971

[21] Appl. No.: 123,359

[52] U.S. Cl. .............210/130, 137/543.19, 210/440, 210/443
[51] Int. Cl. ..........................B01d 35/14, B01d 27/10
[58] Field of Search ......210/130, 440, 443; 251/333; 137/516.15, 516.17, 516.19, 516.21, 516.23, 543.19

[56] References Cited

UNITED STATES PATENTS

| 3,036,711 | 5/1962 | Wilhelm | 210/130 |
| 3,146,194 | 8/1964 | Hathaway | 210/130 |

FOREIGN PATENTS OR APPLICATIONS

| 683,247 | 3/1964 | Canada | 210/130 |

*Primary Examiner*—Frank A. Spear, Jr.
*Attorney*—Olson, Trexler, Wolters & Bushnell

[57] ABSTRACT

An oil filter cartridge has a relief valve unit that shunts the oil flow from the inlet to the outlet of the cartridge when the filter element becomes clogged. The unit comprises a shell that telescopes within the tubular filter medium of the cartridge. The shell contains a valve disc with integral leaf springs that bias the valve disc against valve ports in a plate or wall that is attached to an end of the shell so that when the valve disc is in open position, the oil flows from the inlet of the cartridge through the valve ports and into the shell and then outwardly through a central opening in the plate.

3 Claims, 5 Drawing Figures

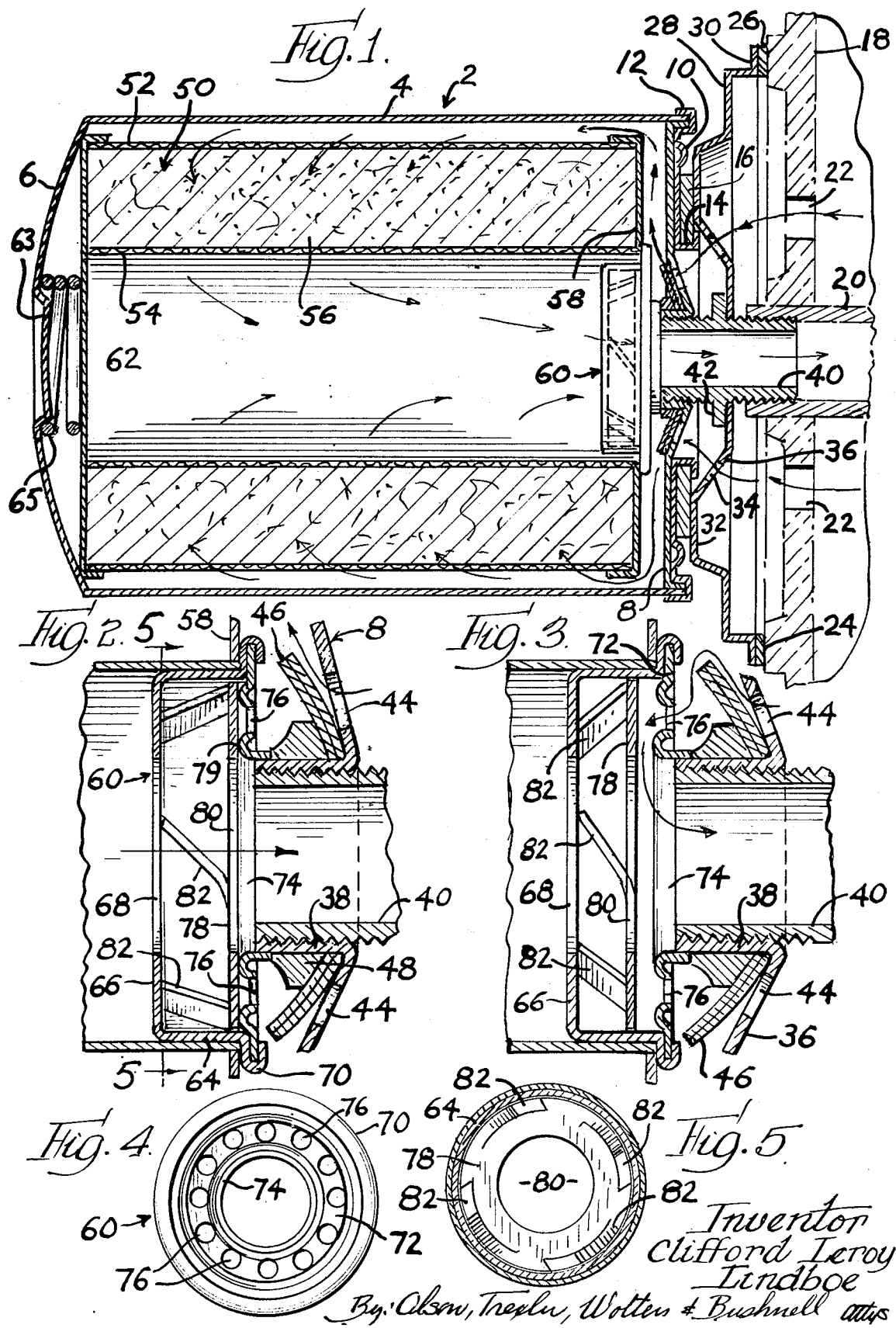

RELIEF VALVE FOR OIL FILTERS OR THE LIKE

BACKGROUND OF THE INVENTION

This invention relates generally to liquid filters, and more particularly to improvements in cannister type filters for lubrication systems of internal combustion engines or other types of machinery.

In lubrication systems for internal combustion engines, it is common to provide for filtration of the full flow of oil rather than only a fractional part thereof. Such systems often employ cannister type oil filters that are intended to be replaced from time to time. However, the filter medium in the cannister sometimes becomes clogged before the cannister is replaced. Therefore, cannisters of the foregoing type have been designed to incorporate therein a relief valve that allows the oil to bypass a clogged filter medium and return to the engine in sufficient quantity even though unfiltered. Prior relief valves have tended to be unnecessarily complicated, thereby increasing the cost of the filter.

OBJECTS AND SUMMARY OF THE INVENTION

It is an object of this invention to provide an improved relief valve unit for the purpose stated that is relatively inexpensive and simple, and yet is rugged and reliable in operation.

A further object of this invention is to provide a relief valve unit that has a relatively short, direct bypass flow path as compared to prior units.

It is also an object of the present invention to provide a filter embodying a relief valve of the foregoing type and wherein the relief valve is so constructed as to be compatible with existing designs of cannister-type filters.

In accordance with the foregoing objects, the invention comprises a relief valve unit that is telescoped within the bore of the filter element in the cannister. The unit comprises a shell having axially spaced, apertured end walls through which oil flows after passing through the filter element when the latter is functioning normally. The shell also houses a valve disc that is perforated to permit filtered oil to pass through the shell. The valve disc integrally includes spring fingers abutting one end wall and biasing the valve disc over valve ports in the other end wall so that an excessive oil pressure at the inlet of the cannister, and thus at the inlet of the valve ports, will lift the valve member from closed position across said valve ports. This will cause oil to flow from said inlet through said valve ports and out through the aperture in said other wall to the outlet of the cannister, bypassing said filter element and without having to flow the length of the shell.

BRIEF DESCRIPTION OF THE FIGURES

In the drawing:

FIG. 1 is a longitudinal sectional view of an oil filter cartridge shown mounted in operative position in a lubrication system and containing a relief valve constructed in accordance with and embodying the present invention;

FIG. 2 is an enlarged portion of FIG. 1 and showing the relief valve in cross section and with the relief valve being closed;

FIG. 3 is a sectional view similar to FIG. 2 and showing the relief valve open;

FIG. 4 is a bottom plan view of the relief valve; and

FIG. 5 is a fragmentary sectional view taken along line 5—5 of FIG. 2.

DETAILED DESCRIPTION

Referring now in more detail and by reference characters to the drawing, there is shown an oil filter cartridge 2 comprising a cannister that has a cylindrical side 4, a dome-like end 6 and an end plate 8 that is opposite to the dome-like end 6. Adjacent to but axially outwardly of the end plate 8 is an annular ring 10 having a peripheral seam 12 by which the ring 10 is marginally secured to the end of the cylindrical wall 4 and also by which the end plate 8 is clinched to the wall 4. At its inner periphery, the annular ring 10 has an annular radially opening groove 14 for receiving an annular resilient sealing gasket 16.

The cartridge 2 may be located in any operative position in a fluid flow system, such as a lubrication system. In the form of the invention herein shown, there is a wall 18 that may be attached to or may form part of an engine block. The wall 18 has a pipe 20 for the intake of filtered oil and orifices 22, 22 disposed about the pipe 20 for discharging oil into the cartridge 2 for filtration therein. The wall 18 has an annular shoulder 24 for receiving a gasket ring 26. An adaptor plate 28 has a peripheral flange 30 that seats against the gasket ring 26.

As will be seen from FIG. 1, the adaptor plate 28 is employed in the removable mounting of the cartridge 2 onto the wall 18. For this purpose, the adaptor plate 28 has an annular ledge 32 against which the gasket 16 is adapted to seat. Radially inwardly of the ledge 32 the adaptor plate 28 has a series of holes 34 that permit oil from the orifices 22 to pass through the adaptor plate 28.

The end wall 8 has a central conical portion 36, the inner margin of which integrally includes an axially extending tube 38 that is internally threaded for receiving an externally threaded tubular fitting 40. The fitting 40 includes a radial flange 42 intermediate its opposite ends. When the cartridge is mounted in place, the fitting 40 threads into the pipe 20 and the flange 42 bears against the flat central portion of the adaptor plate 28 so that the flange 30 seals against the gasket ring 26. When the cartridge 2 is threaded onto the fitting 40 the gasket 16 will seal against the adaptor plate 28 radially outwardly of the holes 34, as shown in FIG. 1.

A short distance radially outwardly of the tube 38, the conical portion 36 has orifices 44 that are adapted to be opened and closed by a check valve disc 46 that is located within the cartridge adjacent to the end plate 8. The check valve disc 46 is held in place by a suitable retaining seal 48. The check valve disc 46 is constructed so as to be biased open, namely away from the orifices 44, by the pressure of the oil passing through the holes 34 and applied to the orifices 44, whereby the oil flows into the cartridge 2 as indicated by arrows in FIGS. 1 and 2.

Within the cartridge 2 is a tubular filtering element 50 that includes inner and outer shells or screens 52, 54 and a porous filter medium 56 between the screens 52, 54. The filtering element also includes an end plate 58 with a central opening that coincides with the central bore of the inner screen 54. Telescoped within the bore of the inner screen 54 is a relief valve unit 60, which will hereinafter be more fully described, and which abuts the retaining seal 48. Adjacent to the dome 6 the filter element 50 has an imperforate end cap 62, and a coil spring 65 extends from a seat 63, that is impressed in the dome 6, to the end cap 62, thereby to retain the filter element 50 firmly within its surrounding container.

Turning now more particularly to FIGS. 2-5 it will be seen that the relief valve unit 60 comprises a tubular body or shell 64, the cylindrical side wall of which is telescoped within the screen 54. The shell 64 integrally includes an end wall 66 having an axial opening 68 therein. At its other end, the cylindrical wall of the shell has an outwardly turned annular flange 70 that abuts the end plate 58 to limit the extent of insertion of the unit 60 into the screen 54 of filter element 50. The flange 70 is curled over to clinch an end plate or wall 72 having a short axial tubular flange 74 that defines an opening through the end wall 72. As best seen in FIGS. 2 and 3, the tubular flange 74 surrounds the tube portion 38 snugly and seals against the retaining seal 48 due to the pressure of the spring 65.

Radially outwardly of the tubular flange 74 are arcuately spaced valve ports 76. Axially slidable within the shell 64 is a valve disc 78 having a central opening 80. The valve disc 80 has struck therefrom a number of spring fingers 82 that are somewhat arcuate in shape and are struck from the peripheral portion of the circular valve disc 78 as shown best in FIG. 5. The tips of the spring fingers 82 bear against the end wall 66 and bias the valve disc 78 across the valve ports 76 to maintain them closed in the normal functioning of the oil filter cartridge. As shown in FIG. 2, an annular rim or bead 79 is formed at the axial interior edge of each port 76 to form seats for the valve disc 78. The valve disc 78 may be fabricated of Martensite steel that is heat treated whereby the grain of the metal remains relatively constant for long periods of time after tempering.

In the normal operation of the filter cartridge 2, the oil flows through a first flow path as depicted by the arrows in FIGS. 1 and 2. Thus, the oil will flow through the check valve ports 44 into the interior of the cannister and to the outer periphery of the filter element 50. The oil then flows radially through the filter element 50 to the central bore thereof and then axially through the valve unit 60 and then outwardly through the fitting 40. If the filter element is not clogged the oil pressure at the valve ports 76 is insufficient to overcome the bias of the spring fingers 82 and thereby lift the valve disc 78 from closed position across the valve ports 76. The upstream opening 68 and the downstream opening defined by the flange 74, as well as the intermediate opening 80 in the valve disc 78 are all sufficiently large so as not to impede to any significant extent the discharge of filtered oil from the filter element 50.

Should the filter element 50 become clogged, the pressure at the holes 34 and at the valve ports 76 will become excessive. This excessive pressure is sufficient to lift the valve disc 78 from across the valve ports 76 so that the oil flows through a second flow path, namely through the ports 76 and directly out of the tubular flange 74 and into the fitting 40, as shown by arrows in FIG. 3. This flow path bypasses the clogged filter element 50. From the foregoing it will be seen that the valve disc 78 should be designed with a spring finger force such that a predetermined pressure at the ports 76 will lift the valve disc from closed position thereacross. This predetermined pressure will be such that the volumetric output from the filter is maintained at least above a prescribed minimum for proper supply of a lubricant to the engine.

The invention is claimed as follows:

1. A relief valve unit for a liquid filter, said unit comprising a body having axially spaced walls and a tubular wall disposed about said axially spaced walls, a valve member within said tubular wall and between said axially spaced walls, said axially spaced walls and said valve member having openings for providing a liquid-flow path generally axially through said body, one of said walls having circumferentially spaced annular beads projecting axially toward said other wall to define circumferentially spaced valve ports between said axially spaced walls, and means normally biasing said valve member to close said valve ports, the ports providing a flow path bypassing the opening in said other wall for liquid from the exterior of said body through the opening in said one wall when the pressure of the liquid at said valve port means is sufficient to overcome the bias on said valve member, said valve member comprising a disc with said biasing means being peripheral spring fingers integral with said disc and imposing pressure on said other wall, said disc being seated across said beads when the valve member is in its valve-closed position.

2. A relief valve unit according to claim 1 in which said valve disc is comprised of a Martensite steel that is heat treated and tempered whereby the grain of the metal remains relatively constant for long periods of time after tempering.

3. In a liquid filter having an inlet and an outlet, a tubular filtering medium, means forming a first liquid-flow path from said inlet to the exterior of the filtering medium and through the tube wall and axially through the bore of the tube for discharge through an outlet, and a relief valve unit downstream of said filtering medium and upstream of said outlet for providing a second flow path from said inlet to said outlet and bypassing said filtering medium upon there being excessive pressure at said inlet due to clogging of said filtering medium; an improvement in which said unit comprises a tubular shell having an upstream opening and a downstream opening in said first flow path, said downstream opening being in communication with said outlet, a valve member in said shell between said openings and being constructed to permit the passage of liquid therepast, said shell having valve port means in said second flow path, and means in said shell biasing said valve member to close said port means, said port means being downstream of said upstream opening and in communication with said inlet, said port means also being in communication with said downstream opening when the pressure of the liquid at said port means is sufficient to overcome the bias on said valve member whereby fluid flowing through said second flow path flows into the shell but bypasses said upstream opening, said shell having axially spaced walls that contain said upstream and downstream openings, the wall with said downstream opening also having circumferentially spaced annular beads projecting toward the other wall and defining said port means, said valve member comprising a disc with said biasing means being peripheral spring fingers integral with said disc and imposing pressure on said other wall, said disc being seated across said beads when the valve member is in its valve-closed position.

* * * * *